United States Patent
Piëch et al.

(10) Patent No.: US 6,946,954 B2
(45) Date of Patent: Sep. 20, 2005

(54) DEVICE AND METHOD FOR MONITORING THE AIR PRESSURE IN THE TIRES OF A MOTOR VEHICLE

(75) Inventors: Ferdinand Piëch, Salzburg (AT); Rolf Reinke, Grussendorf (DE); Berend Wegner, Wolfsburg (DE)

(73) Assignee: Wolkswagen Aktiengesellschaft, Wolfsburg (DE)

( * ) Notice: Subject to any disclaimer, the term of this patent is extended or adjusted under 35 U.S.C. 154(b) by 45 days.

(21) Appl. No.: 10/455,177

(22) Filed: Jun. 5, 2003

(65) Prior Publication Data

US 2003/0227380 A1 Dec. 11, 2003

Related U.S. Application Data

(63) Continuation of application No. PCT/EP01/13366, filed on Nov. 19, 2001.

(30) Foreign Application Priority Data

Dec. 5, 2000 (DE) .......................................... 100 60 392

(51) Int. Cl.$^7$ .............................................. B60C 23/00
(52) U.S. Cl. ...................... 340/444; 340/442; 340/443; 73/146; 73/146.3; 73/146.5
(58) Field of Search ................................ 340/442, 443, 340/444; 73/146, 146.3, 146.5

(56) References Cited

U.S. PATENT DOCUMENTS

| | | | |
|---|---|---|---|
| 4,845,649 A | * | 7/1989 | Eckardt et al. ............. 702/104 |
| 5,774,048 A | | 6/1998 | Achterholt |
| 5,982,279 A | * | 11/1999 | Tominaga et al. .......... 340/444 |
| 6,591,668 B1 | * | 7/2003 | Becherer et al. .............. 73/146 |

FOREIGN PATENT DOCUMENTS

| | | |
|---|---|---|
| DE | 3630116 A1 | 3/1988 |
| DE | 4309265 A1 | 10/1993 |
| DE | 4303583 A1 | 8/1994 |
| DE | 19602593 C1 | 5/1997 |
| DE | 19625544 C1 | 8/1997 |
| WO | 97/09188 | 3/1997 |

OTHER PUBLICATIONS

Anonymous: "Lower Cost Method to Monitor Tire Inflation Pressure for Extended–Mobility Tires", Mar. 1998, XP–000773835.

* cited by examiner

*Primary Examiner*—Julie Bichngoc Lieu
(74) *Attorney, Agent, or Firm*—Laurence A. Greenberg; Werner H. Stemer; Manfred Beck

(57) ABSTRACT

A device for monitoring air pressure in the tires of a vehicle includes devices for determining the wheel speed or other characteristic variables for the speed of the tires of the vehicle, a device for calculating differential variables on the basis of the wheel speed variables, a device for evaluating the differential variables with respect to a setpoint value deviation and for generating a warning signal if the setpoint value deviation exceeds a threshold value, and a device for directly measuring the air pressure in the tire of a wheel and for transferring an air pressure characteristic variable to the evaluation device. A warning signal is generated if the deviation of the air pressure characteristic variable with respect to a setpoint value exceeds a corresponding threshold value. A method of monitoring tire pressures is also provided.

12 Claims, 5 Drawing Sheets

DEVICE AND METHOD FOR MONITORING THE AIR PRESSURE IN THE TIRES OF A MOTOR VEHICLE

CROSS-REFERENCE TO RELATED APPLICATION

This application is a continuation of copending International Application No. PCT/EP01/13366, filed Nov. 19, 2001, which designated the United States and was not published in English.

BACKGROUND OF THE INVENTION

Field of the Invention

The invention relates to a device for monitoring the air pressure in the tires of a motor vehicle. The device for monitoring the air pressure includes devices for determining variables which characterize the speeds of the wheels of the motor vehicle, a device for calculating differential variables from the wheel speed variables, a device for evaluating the differential variables and a device for directly measuring the air pressure in a tire of a wheel and for transmitting a variable which characterizes the air pressure to the evaluation device. Furthermore, the invention relates to a corresponding method for monitoring the air pressure in the tires of a vehicle.

Maintaining the correct tire pressure in a motor vehicle is highly important for safety on the road as well as for fuel consumption. It is therefore recommended to monitor the tire pressure at regular intervals in order to detect pressure losses and take suitable countermeasures. This is in general done by refilling the tires with compressed air. However, the operator of the motor vehicle often neglects to regularly check the tire pressure so that the tire pressure may drop, for example due to creeping diffusion losses, to a level which is below the optimum level for driving.

For this reason, a number of devices with which an automatic warning about an incorrect tire pressure can be issued to the operator of the vehicle have been proposed. These devices allow detecting relatively quickly occurring pressure losses in individual tires, usually caused by tire damage or valve damage, as well as slowly occurring pressure losses in all the tires.

Published, Non-Prosecuted German Patent Application No. DE 43 03 583 A1 and German Patent No. DE 196 02 593 C each disclose a tire valve with which the tire pressure is measured directly at a vehicle wheel. The pressure information which is determined is transmitted to a receiver via a battery-operated transmitter which is integrated into the valve. The receiver is mounted on the vehicle in a fixed position and interacts with an evaluation device. When there is a deviation in pressure, an appropriate warning signal is generated and displayed to the operator of the vehicle.

Such devices are generally very costly and complex because, due to the dynamic forces caused by the valves during driving, the valves should be very small and because there are limits on the valves in terms of a long service life and sufficient transmission power for a reliable transmission of information. Further, the pressure measurement and the generation of data must be performed entirely in the valves.

In addition to an integration of the pressure measurement into the tire valves, Published, Non-Prosecuted German Patent Application No. DE 43 09 265 A1 suggests partially embedding a system which directly measures the tire pressure in a wheel rim. Thus the spatial restrictions are somewhat alleviated. However, this requires special wheel rims with pressure ducts extending in the wheel rims.

Furthermore it is known to monitor the air pressure in the tires indirectly, i.e. without a direct measurement of pressure. A corresponding device is described in Published, Non-Prosecuted German Patent Application No. DE 36 30 116 A1 as an alternative to the transmitter/receiver systems explained above. In the device according to Published, Non-Prosecuted German Patent Application No. DE 36 30 116 A1, the wheel speeds which are sensed in an anti-lock brake system are used to determine pressure changes in the tires. For this purpose, the wheel speed signals or signals derived therefrom, for example the dynamic rolling circumference, are compared with one another or with a reference signal derived from the wheel signals. When the deviations exceed a threshold value, it is concluded that a pressure loss has occurred. The pressure loss is then displayed to the operator of the vehicle. The evaluation of the signals is carried out for representative driving states. This rules out the possibility of speed differences causing a tire pressure warning when traveling through a curve.

However, in such systems which operate indirectly, creeping pressure losses are difficult to detect if they occur simultaneously at several tires. German Patent No. DE 196 25 544 C therefore proposes in this context, as a remedy, that the derived wheel speed information which is output by the anti-lock brake system is recorded for each wheel in a history list. By evaluating the recorded values, it is concluded that there is a creeping pressure loss if the values have a falling tendency. However, this procedure requires a considerable degree of expenditure on calculation and memory requirements.

Furthermore, in indirectly operating systems of the type explained above, a standardization is usually necessary with reference to a "correct" system state as the method of operation is based on the fact that the air pressure in a tire influences the rolling circumference of the respective tire. However, the pressure dependence is very small and therefore difficult to measure. The wheel speed sensors which are present for the anti-lock brake system are used to infer a pressure loss by measuring the covered travel and comparing the travel values for the four wheels. As the changes in circumference of the tires are virtually impossible to resolve even when there is a relatively large pressure loss, the interference sources, in particular the different tire pressures due to tire tolerances or different wear must be eliminated during the evaluation of the wheel speed signals or the derived signals. The customary procedure is to input correction values into the system in a learning phase, which values are sensed at the time of a "correct" system state. This is carried out, for example, through the use of a calibration key which has to be operated by the operator of the vehicle.

However, if the key is operated incorrectly, there is a risk of the system becoming detuned. This can result in incorrect warnings or can have the result that no warning is issued when it is actually necessary. International Publication No. WO 97/09188 proposes starting the learning phase automatically through the use of switches coupled to the shock absorbers in order to relieve the operator of the vehicle, the switches then triggering when a specific spring travel is reached. However, this also requires a "correct" system state with the correct tire pressure to be present in the data collection state of the learning phase.

Furthermore, the article having the title "Lower Cost Method to Monitor Tire Inflation Pressure for Extended-Mobility Tires," Research Disclosure, Kenneth Mason Publications, Hampshire, GB, No. 407, page 203, discloses that the pressure in one tire is measured in an absolute manner and the pressures in the other tires are calculated from the wheel speed signals of an ABS system (anti-lock braking system) using the measured pressure.

SUMMARY OF THE INVENTION

It is accordingly an object of the invention to provide a device and a method for monitoring an air pressure in tires of a motor vehicle which overcome the above-mentioned disadvantages of the heretofore-known methods and devices of this general type and which provide an improved generation of warning signals for the combined warning system explained above in order to monitor tire pressures.

With the foregoing and other objects in view there is provided, in accordance with the invention, a device for monitoring an air pressure in vehicle tires, including:

determining units configured to determine wheel speed variables characterizing wheel speeds of a motor vehicle;

a calculating unit operatively connected to the determining units and configured to calculate differential variables from the wheel speed variables;

an evaluation unit configured to evaluate the differential variables with respect to a setpoint value deviation, the evaluation unit generating a warning signal if the setpoint value deviation exceeds a first threshold value;

a measuring unit operatively connected to the evaluation unit, the measuring unit being configured to directly measure an air pressure in a tire of a wheel and configured to transmit a pressure variable characterizing the air pressure to the evaluation unit; and the evaluation unit further generating a warning signal if a deviation of the pressure variable from a pressure setpoint value exceeds a second threshold value, the evaluation unit using a first tolerance range for a permitted setpoint value deviation of the differential variables, the first tolerance range representing a first pressure difference range, the evaluation unit further using a second tolerance range for a permitted setpoint value deviation of the pressure variable, the second tolerance range representing a second pressure difference range, the first pressure difference range being smaller than the second pressure difference range.

In other words, according to the invention, a device for monitoring the air pressure in the tires of a motor vehicle, includes:

devices for determining variables which characterize the speeds of the wheels of the motor vehicle;

a device for calculating differential variables from the wheel speed variables;

a device for evaluating the differential variables;

a device for directly measuring the air pressure in a tire of a wheel and for transmitting a variable which characterizes the air pressure to the evaluation device;

the evaluation device evaluates the differential variables with respect to a setpoint value deviation and generates a warning signal if the setpoint value deviation exceeds a threshold value;

the evaluation device further generates a warning signal if the deviation of the variable which characterizes the air pressure from a setpoint value exceeds an associated threshold value; and the tolerance range for the permitted setpoint value deviation of the differential variables represents a smaller pressure difference range than the tolerance range for the permitted setpoint value deviation of the variable which characterizes the air pressure.

This provides a cost-effective way of monitoring tire pressures, which continues to use the wheel speed signals made available by an anti-lock brake system and in that respect builds on the method of indirect monitoring of tire pressures. However, the additional provision of the actual pressure in a tire considerably simplifies the evaluation of the obtained signals for the evaluation of the occurrence of a creeping pressure loss.

In order to monitor the air pressure in the tires, the procedure adopted is that firstly the variables which characterize the wheel speeds are sensed for the wheels of the motor vehicle, differential variables are formed therefrom and when the differential variables deviate from a setpoint value by more than a threshold value a warning signal is generated. This corresponds basically to the procedure already explained above. However, in addition, the air pressure in a tire is measured directly at one of the wheels. When it deviates from a setpoint value by more than a further threshold value, a warning signal is generated. This makes it possible to observe, on the one hand, whether an excessively large pressure drop occurs at a single tire in comparison with the other wheels, as would be the case, for example, when a sudden tire damage or valve damage occurs. On the other hand, the direct measurement of pressure is used to determine whether the tolerance band of tire pressures, which is permitted for optimum driving, drops below a specific pressure level, in order to detect a simultaneous, creeping pressure loss in all the tires.

Furthermore, incorrect interpretations during the evaluation of data are reduced to a minimum as the measured tire pressure is used as a reference variable and in this respect it is not necessary to resort to derived variables such as a history list, for example.

By providing the measured air pressure at a wheel as a reference variable, the calibration device, which is explained above, can also be dispensed with and the operator control errors which are associated with it thus avoided. Instead, information which describes the actual air pressure at a wheel is now always available, independently of the system state. On the basis of this information it is possible, in combination with the further interpretation of the information derived from the wheel speed signals, to make a reliable determination of the air pressure in all the tires without having to measure the actual air pressure in all the tires for this purpose.

In addition, the tolerance range for the setpoint value deviation of the differential variables represents a smaller pressure difference range than the tolerance range for the setpoint value deviation of the variable which characterizes the air pressure. This permits a procedure in which firstly the general pressure level is determined through the use of a reference measurement. If this general pressure level lies below a desired setpoint value, the unit in the evaluation device uses a calculation algorithm to determine, based on the wheel speed information, whether the threshold values of the differential variables between the individual tires are considerably exceeded. If the latter is not the case, then this state is categorized as a creeping pressure loss and is displayed to the operator of the vehicle with a corresponding signal.

If, on the other hand, the measured pressure is in the permitted range around the desired pressure setpoint value, and if, when the wheel speed information is evaluated, it is detected that a threshold value of the differential variables is exceeded, then this is diagnosed as an incorrect tire pressure at a specific tire. By suitably evaluating the wheel speed information it is possible to let the driver know at which tire the incorrect tire pressure is present.

According to another feature of the invention, the evaluation unit determines for each respective tire a respective pressure variable from an air pressure variable measured by the measuring unit and from the differential variables, the respective pressure variable determined by the evaluation unit characterizes a respective air pressure of a respective tire; and the evaluation unit evaluates whether a respective setpoint value deviation of the respective pressure variable determined by the evaluation unit exceeds a corresponding threshold value.

According to another feature of the invention, a temperature compensation unit is operatively connected to the evaluation unit, the temperature compensation unit is configured to compensate a measured pressure variable and/or the pressure setpoint value in order to determine a deviation of the pressure variable characterizing the air pressure.

According to yet another feature of the invention, the evaluation unit compares the wheel speed variables with a setpoint value formed as a mean value of all wheel speed variables.

According to a further feature of the invention, the calculation unit determines the differential variables for respective two wheels; and the measuring unit for directly measuring an air pressure is assigned to one of the respective two wheels.

According to another feature of the invention, at least a further measuring unit is operatively connected to the evaluation unit for directly measuring an air pressure; and the measuring unit and the further measuring unit are respectively assigned to one wheel of a respective wheel axle of the motor vehicle.

In principle it is possible to carry out the indirect tire pressure monitoring and the direct pressure monitoring, which is performed by a measurement, independently of one another in parallel, each system generating a warning signal when specific evaluation criteria are present. By matching the two systems to one another, in particular by matching their threshold values, which bring about the generation of the warning signals it is possible to implement a simple and cost-effective way of monitoring tire pressures, which permits high reliability of the information about the tire pressure state generated in this way. However, it is also possible to link the information obtained from the two systems more closely to one another. For example, it is possible to use the measured tire pressure and the differential variables derived from the wheel speed signals to calculate the tire pressure in those tires at which no direct pressure measurement takes place. One possible way of doing this is, for example, to determine for each tire, in the evaluation device, the variable which characterizes the air pressure of the respective tire from the measured air pressure variable and from the differential variables; the setpoint value deviation of which variable is evaluated with respect to whether it exceeds the associated threshold value. This makes it possible, as it were, to implement individual monitoring of the air pressure in all the tires of the motor vehicle without a separate device for the direct measurement of pressure being required for each individual vehicle wheel or the associated tire.

As a rule, a respective different tire pressure is predefined for the front wheels and the rear wheels. When a single device which measures pressure directly is used, the desired pressure difference between the front wheels and rear wheels must be taken into account in the interpretation of the differential variables in the evaluation device. However, this can be avoided by, for example, providing a device for directly measuring the air pressure for each wheel axle of the motor vehicle, on one wheel. This permits a very simple method of operation to be implemented in which, in addition to the measured air pressure, only one differential variable is required as further information for each wheel axle, wherein the differential variable can be derived from the two wheel speed signals of the two wheels of the respective wheel axle.

It is known that the tire pressure is dependent on the temperature of the tire. It is therefore advantageous if the measured pressure value or the setpoint value is temperature-compensated in order to determine the deviation from the variable which characterizes the air pressure. For this purpose, it is possible to provide a corresponding device for temperature compensation. The latter is installed, for example, in a pressure sensor in the form of a temperature sensor which is mounted on the tire or the vehicle wheel. In this case, the measured pressure variable is compensated so that only one item of information has to be transmitted from the vehicle wheel to the evaluation device which is mounted in a fixed fashion on the vehicle. However, it is also possible to transmit the temperature information separately from the pressure information to the evaluation device and only combine it there with the measured pressure information or else with the predefined setpoint value. The predefined setpoint value can be predefined as a fixed variable and stored in the evaluation device. However, as a rule, the setpoint value depends on a plurality of further parameters such as, for example, the loading of the vehicle or the type of tire used, which are taken into account in the generation of the setpoint value.

In a further advantageous embodiment of the invention, the wheel speed variables are each compared with a mean value, formed over all the wheel speed variables, as a setpoint value. This setpoint value can then be used as the center of a tolerance band to which the still permitted setpoint deviation is related as a threshold value.

Furthermore, it is possible to derive the differential variables for example from the wheel speed variables in such a way that these are respectively determined for precisely two wheels, one of the wheels being assigned the device for directly measuring the air pressure. In this case, the tire pressure of the respective wheel can be derived particularly easily for each wheel from the associated differential variable with respect to a reference wheel, and from the measured tire pressure in the reference wheel.

With the objects of the invention in view there is also provided, a method for monitoring an air pressure in tires of a motor vehicle, the method includes the steps of:
sensing wheel speed variables for wheels of a motor vehicle, the wheel speed variables characterizing wheel speeds;
forming differential variables from the wheel speed variables;
generating a warning signal if the differential variables deviate from a first setpoint value by more than a first threshold value;
directly measuring an air pressure in a tire of one of the wheels for providing a measured air pressure value;
generating a warning signal if the measured air pressure value deviates from a second setpoint value by more than a second threshold value; and
setting a first tolerance range for a setpoint value deviation of the differential variables and setting a second tolerance range for a setpoint value deviation of a variable characterizing an air pressure in a tire such that the first tolerance range represents a first pressure difference range and the second tolerance range represents a second pressure difference range and such that the first pressure difference range is smaller than the second pressure difference range.

In other words, according to the invention, there is provided a method for monitoring the air pressure in the tires of a motor vehicle, wherein:

variables which characterize the wheel speed are sensed for the wheels of the motor vehicle, differential variables are formed therefrom and when the differential variables deviate from a setpoint value by more than a threshold value a warning signal is generated;

the air pressure in a tire is measured directly on one of the wheels and when it deviates from a setpoint value by more than a further threshold value a warning signal is generated; and the tolerance range for the setpoint value deviation of the differential variables represents a smaller pressure difference range than the tolerance range for the setpoint value deviation of the variable which characterizes the air pressure.

Another mode of the method according to the invention includes determining for each respective tire a respective pressure variable from a measured pressure variable and from the differential variables such that the respective pressure variable characterizes a respective air pressure of a respective tire; and evaluating whether a respective setpoint value deviation of the respective pressure variable exceeds a corresponding threshold value.

Yet another mode of the method according to the invention includes temperature-compensating a measured pressure variable and/or the second setpoint value.

A further mode of the method according to the invention includes comparing the wheel speed variables with a setpoint value formed as a mean value of all wheel speed variables.

Another mode of the method according to the invention includes determining the differential variables for respective two of the wheels; and directly measuring an air pressure of one of the respective two of the wheels.

Yet another mode of the method according to the invention includes directly measuring the air pressure of one wheel of each wheel axle of the motor vehicle.

Other features which are considered as characteristic for the invention are set forth in the appended claims.

Although the invention is illustrated and described herein as embodied in a device and a method for monitoring the air pressure in the tires of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
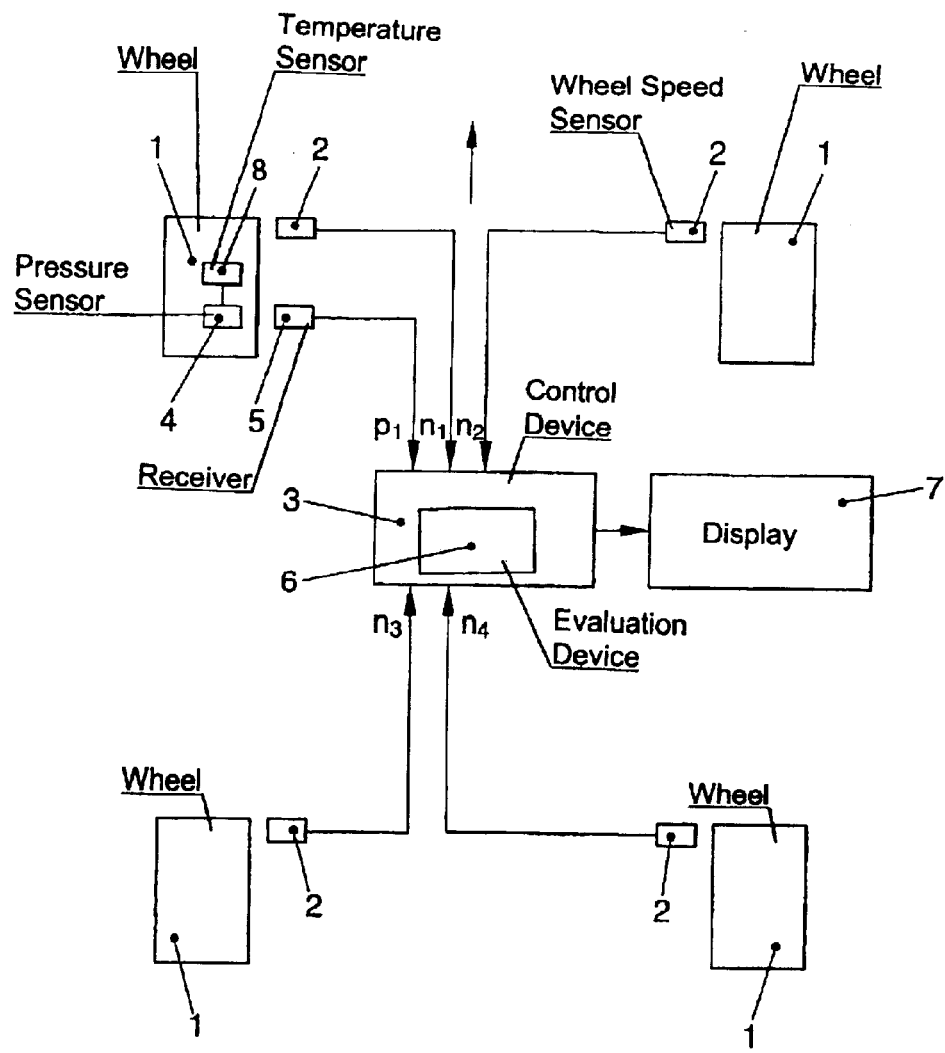
FIG. 1 is a schematic view of a first exemplary embodiment of a device for monitoring the air pressure in the tires of a motor vehicle according to the invention.

Referring now to the figures of the drawings in detail and first, particularly, to FIG. 1 thereof, there is schematically shown a motor vehicle of which here only the vehicle wheels 1 and a first exemplary embodiment of the device for monitoring the air pressure in the tires of the vehicle wheels 1 are illustrated.

The device for monitoring the air pressure includes devices 2 for determining the wheel speeds or other variables which characterize the speeds of the wheels of the motor vehicle and also a device for calculating differential variables $\Delta n_{i1}$ from the wheel speed variables. Here, an anti-lock brake system which is installed in the motor vehicle is used, the system's sensors for sensing the wheel speeds $n_i$ ($n_i$ being the wheel speed or wheel speed variable of the i-th wheel) and the system's devices for determining the travel speed constituting, at the same time, part of the tire pressure monitoring device and being used to derive the speed variables.

The sensed wheel speed variables or wheel velocity variables, referred to in FIG. 1 by $n_1$ to $n_4$, are processed in a central control device 3 which is mounted in a fixed fashion on the vehicle. This control device 3 contains, inter alia, devices for calculating the differential variables $\Delta n_{i1}$ from the wheel speed variables or velocity variables which are made available by the anti-lock brake system. In an exemplary embodiment, the differential variable $\Delta n_{i1}$ is the deviation of the wheel speed variable or velocity variable $n_i$ from the wheel speed variable or velocity variable $n_1$ of the wheel using a direct pressure measurement. However, it is also possible to supply the control device 3 with differential variables $\Delta n_{i1}$ which have already been generated in the anti-lock brake system.

Furthermore, the tire pressure monitoring device includes a device 4 for directly measuring the air pressure $p_1$ in a tire of a vehicle wheel 1, precisely one such device being provided by way of example on the front left-hand wheel 1 in the exemplary embodiment according to FIG. 1. This pressure measuring device 4 is integrated, for example as a pressure sensor, into a tire valve which also contains a transmitting device for transmitting in a wireless fashion the measured tire pressure $p_1$ or an information item $p_1$ which characterizes the pressure to a receiver device 5 which is mounted on the motor vehicle in a fixed fashion. The variable $p_1$ which characterizes the measured tire pressure is then transmitted by the receiver device 5 to the control device 3 and further processed there. It is also possible to integrate the receiver device 5 directly into the control device 3 or to perform the pressure measurement at some other point on the vehicle wheel 1, for example in the wheel rim.

In order to compensate for pressure fluctuations due to temperature changes, the pressure sensor is preferably combined with a temperature sensor 8 so that a temperature-corrected signal is already transferred to the receiver device 5 by the pressure measuring device.

The generated signals are processed in an evaluation device 6 of the control device 3. This involves determining the deviations of setpoint values. If the deviation exceeds a specific threshold value, a warning signal is generated and conveyed to the driver of the vehicle via a display device 7. The warning is communicated to the driver visually and/or audibly in the visual range so that it can be perceived while the driver is driving. It is also possible to differentiate or distinguish in accordance with the type of errors which have occurred in order to let the driver know at which tire a deviation of the air pressure has occurred, or whether the pressure level at all the tires has dropped below a critical value, for example due to creeping losses.

Figure 2:
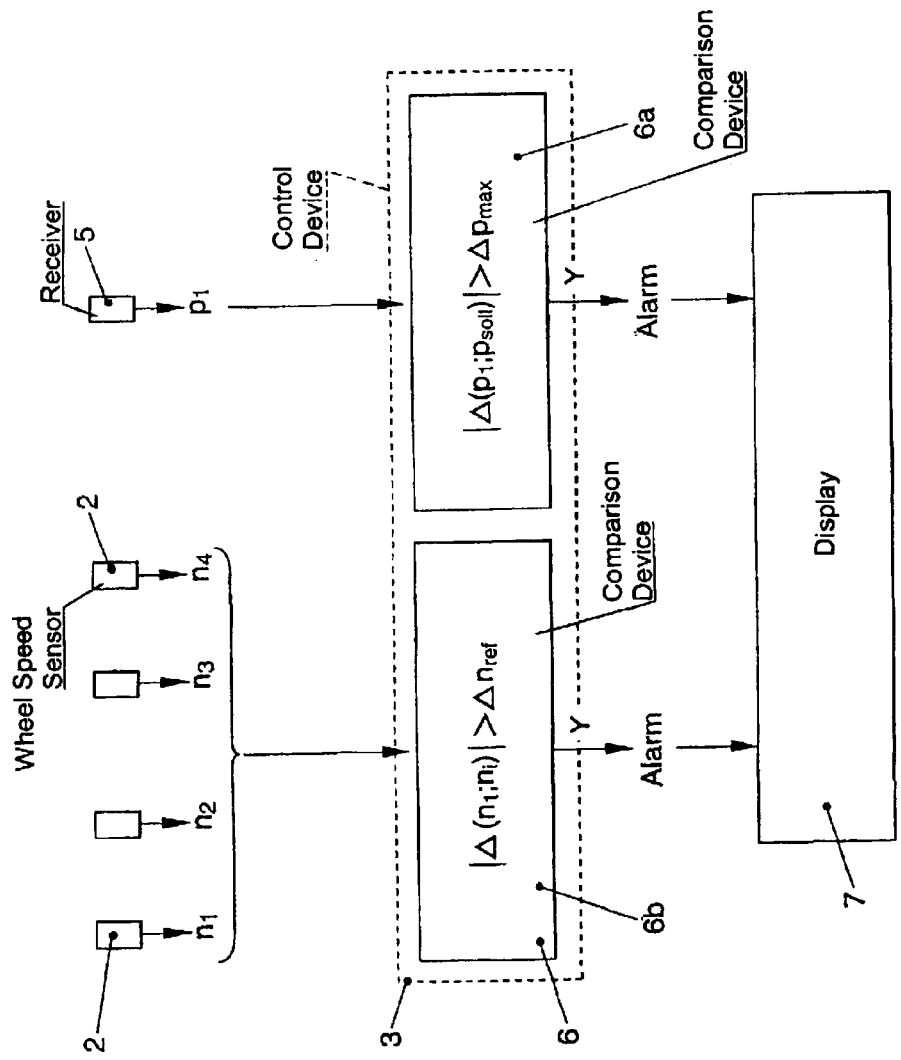
FIG. 2 is a block diagram illustrating the method of operation of the device illustrated in FIG. 1.

FIG. 2 shows an example of the method of operation of the device explained above. Here, the indirect monitoring of the tire pressure on the basis of the wheel speed variables and the direct pressure measurement at a vehicle wheel 1 are performed in parallel. This takes place at regular time intervals or else continuously during driving mode. If the variables which are to be evaluated are outside a specific tolerance range, a warning signal is respectively generated on an individual basis.

During the direct measurement of pressure, this takes place when the deviation between the measured tire pressure $p_1$ and a predefined setpoint value $p_{setp}$ exceeds a specific threshold value or exceeds the pressure difference $\Delta p_{max}$ which represents a tolerance range which is still acceptable for optimum driving. In an exemplary embodiment, the pressure difference $\Delta p_{max}$ is the maximum permitted deviation from the pressure setpoint value $p_{setp}$ for the tire pressure of the wheel having the direct pressure measurement. For the purpose of comparing pressure variables, a suitable comparison device 6a is provided in the evaluation device 6. The setpoint value $p_{setp}$ is not necessarily a fixedly predefined parameter here. Instead, it is adapted to the operating states of the vehicle in order to take into account, for example, the load of the vehicle or the type of tire used. A setpoint adjuster is preferably used for this purpose.

In the same way, the differential variables $\Delta n_{i1}$ are monitored with respect to a threshold value in the form of a still acceptable wheel speed differential or wheel velocity differential $\Delta n_{ref}$ in a further comparison device 6b the formation of differences taking place in each case between a wheel speed value or wheel velocity value of a vehicle wheel and a wheel speed value or wheel velocity value of that vehicle wheel at which the direct pressure measurement is performed. An identical threshold value $\Delta n_{ref}$ is provided for all the values in the exemplary embodiment. Exceeding the threshold value $\Delta n_{ref}$ causes, expressed in a simplified manner, the generation of a warning signal. However, it is also possible to define a separate threshold value $\Delta n_{ref}$ for each pair of wheels.

When a threshold value is exceeded, in order to rule out the risk of a false alarm, this event is checked, for example by determining and evaluating the initial information again, that is to say the wheel speed variables and the variable which characterizes the air pressure in a tire. A warning signal is generated only if the first prognosis is established. Here it is also made sure that the vehicle is in a driving state which is suitable for monitoring the tire pressure, that is to say for example is not traveling through a curve at that particular time. Traveling through a curve may be determined, inter alia, by sensing the steering angle. In this case, the evaluation of the information on which the monitoring of the tire pressure is based is then suppressed.

Figure 3:
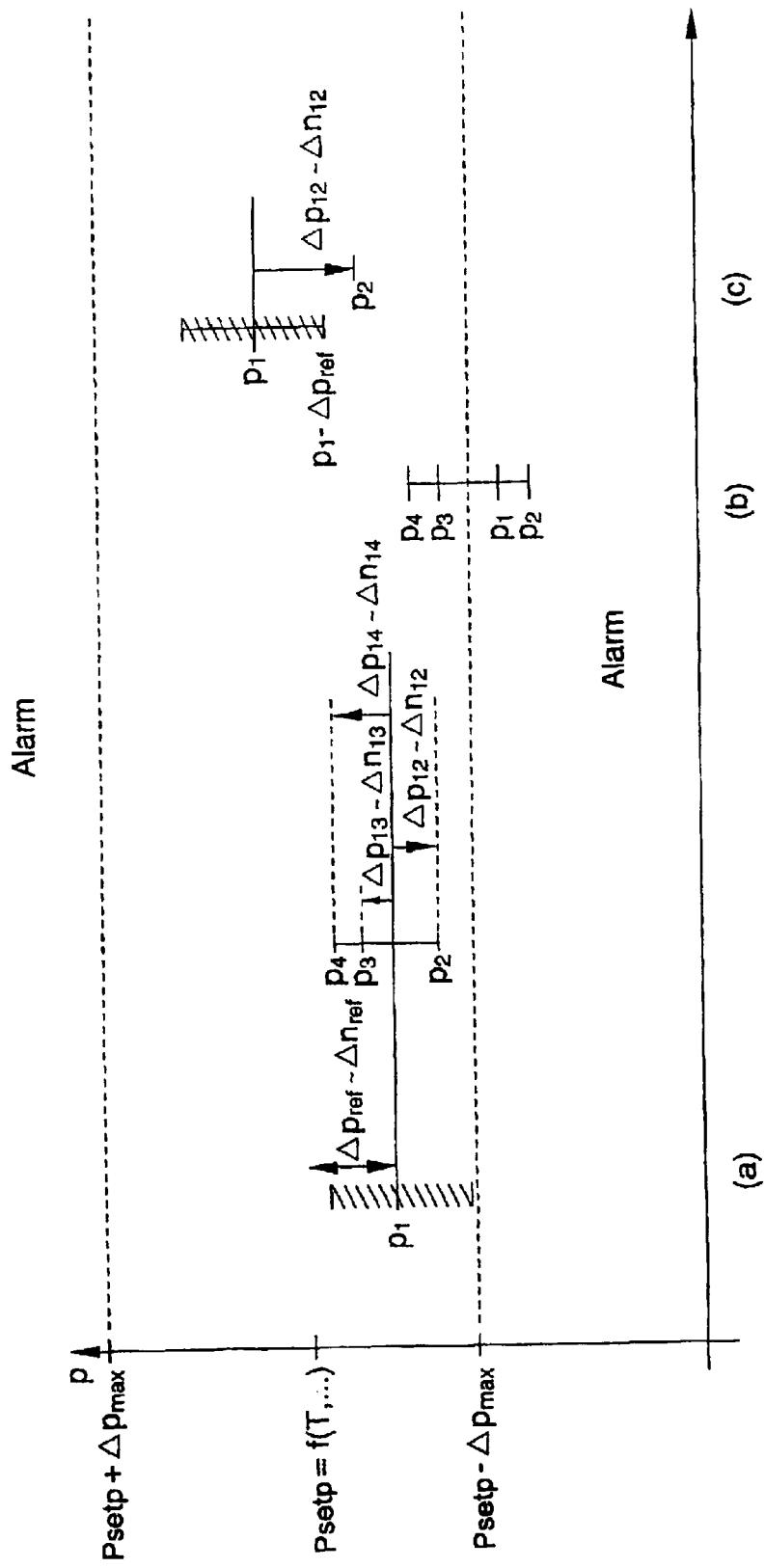
FIG. 3 is graph explaining the method of operation of the device illustrated in FIG. 1.

The way in which the first exemplary embodiment functions is apparent from FIG. 3 in which three different tire pressure states of the vehicle are represented by (a), (b) and (c). Here, (a) represents a normal state in which a "correct" tire pressure $p_i$ (i=1 to 4) is present in each tire. Furthermore, the pressure differences $\Delta p_{1i}$ with respect to that tire at which the direct pressure measurement $p_1$ takes place are plotted in FIG. 3. Differential variables $\Delta n_{1i}$ of wheel speed variables or wheel velocity variables, which are known from the indirect monitoring of tire pressure, correspond to these pressure differences $\Delta p_{1i}$, in which case, if appropriate, a correction factor can be included in the calculations. In the normal state (a) in FIG. 3, the differential variables all lie within the permitted tolerance band with the maximum permitted deviation $\Delta n_{ref}$ which is plotted in terms of a pressure variable $\Delta p_{ref}$ in FIG. 3 and is illustrated as a hatched band. As is also apparent from FIG. 3, this tolerance band is narrower than the tolerance band for the setpoint pressure value $p_{setp}$.

In the case of the state (b), the pressure level in all the tires has dropped due to a creeping pressure loss. As soon as the pressure in that tire in which the direct pressure measurement takes place drops below the lower permitted threshold $p_{setp}-\Delta p_{max}$ of the pressure value, an alarm signal is generated. Because the tolerance band for the indirect monitoring of tire pressure is very narrow in comparison with the tolerance band for the direct measuring of pressure, it is completely sufficient to perform the direct measurement of pressure only on a single tire of the vehicle. A direct measurement of pressure can also be carried out only on a single tire of a wheel axle. In any case, corresponding, costly sensing devices are dispensed with in comparison with a direct pressure measurement on all the tires.

The state (c) represents the case in which the pressure $p_2$ in a tire drops significantly in comparison with the pressures in the other tires without, however, the pressure $p_1$ in the directly monitored tires leaving the permitted tolerance range. Such a pressure drop is detected during the indirect monitoring of tire pressure in the comparison device 6b of the control device 3 on the basis of the wheel speed which is increased at a constant vehicle speed, and the pressure drop is appropriately signaled to the driver, wherein it is possible at the same time to let the driver know at which tire the fault has occurred.

Figure 4:
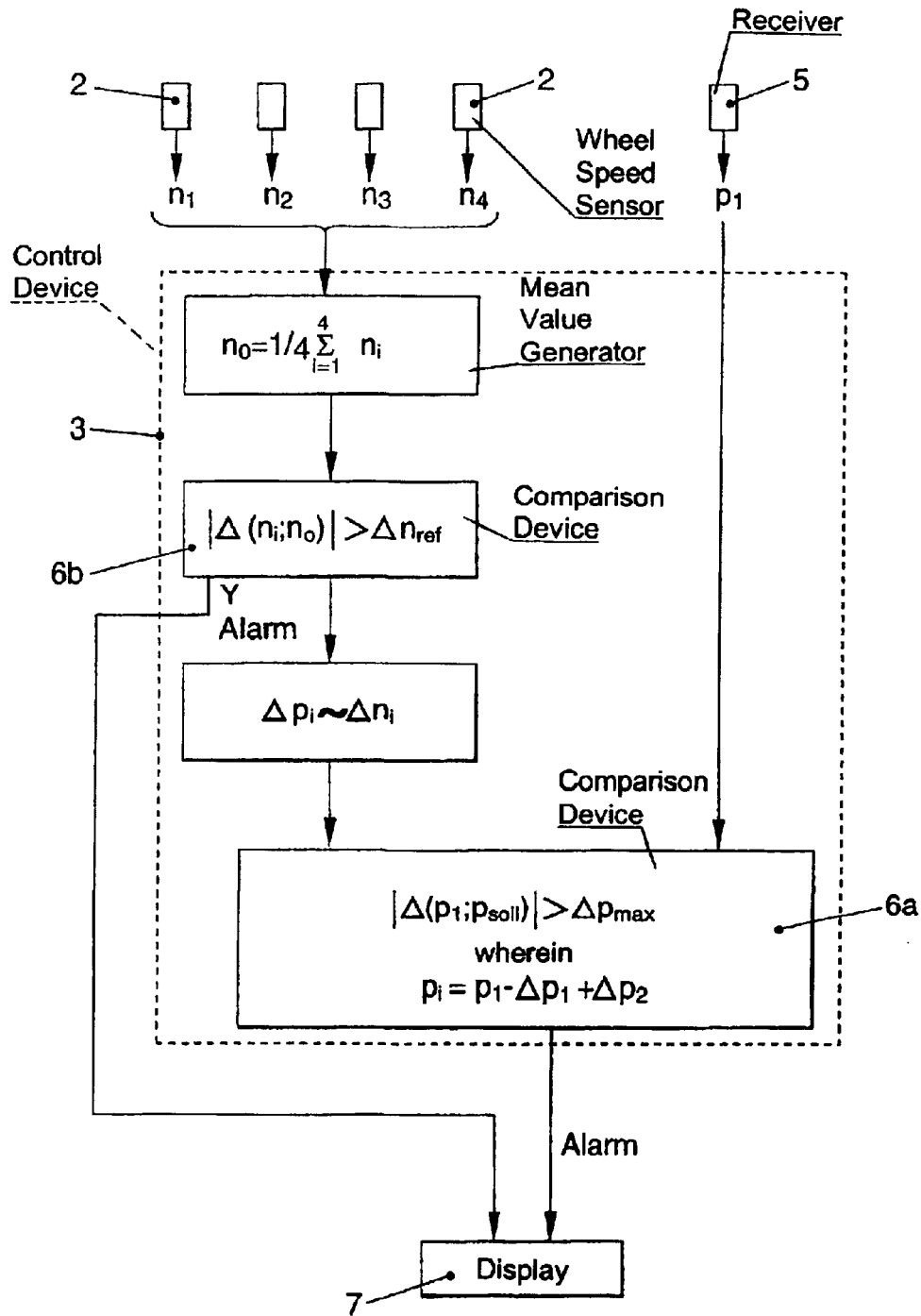
FIG. 4 is a block diagram illustrating the device and the method of operation of a further exemplary embodiment of a device for monitoring the air pressure in the tires of a motor vehicle according to the invention.

FIG. 4 shows a further exemplary embodiment of a device for monitoring tire pressure which differs from the first exemplary embodiment especially in the evaluation of the initial information which is made available. Thus, in the second exemplary embodiment, firstly a reference variable $n_0$, which constitutes the mean value of the wheel speed variables or wheel velocity variables $n_i$ here, is determined in the control device 3 during the processing of the wheel speeds. In a refinement of the embodiment which is illustrated it is also possible to form a weighted mean value, a separate weighting factor being assigned to each wheel speed variable $n_i$. Differential variables $\Delta n_i$ are generated from the individual wheel speed variables $n_i$ using the reference variable $n_0$ and are put in relation to a threshold value $\Delta n_{ref}$. When the threshold value $\Delta n_{ref}$ is exceeded, a warning signal is generated and displayed, as in the first exemplary embodiment. In this way, it is possible to sense the occurrence of a pressure difference between the individual tires efficiently.

The direct monitoring of tire pressure can be carried out in parallel as in the first exemplary embodiment. However, in the case illustrated in FIG. 4, the pressures in the tires which are not monitored directly are determined from the differential variables $\Delta n_i$ and the directly measured pressure $p_1$ and are compared with a setpoint value $p_{setp}$ for the absolute pressure. If the deviation from the setpoint pressure value $p_{setp}$ exceeds a specific threshold value $\Delta p_{max}$, a warning signal is triggered also. This procedure has the advantage that a warning signal is triggered even then when the pressure in a tire which is not monitored directly goes outside the tolerance band for the absolute pressure.

Figure 5:
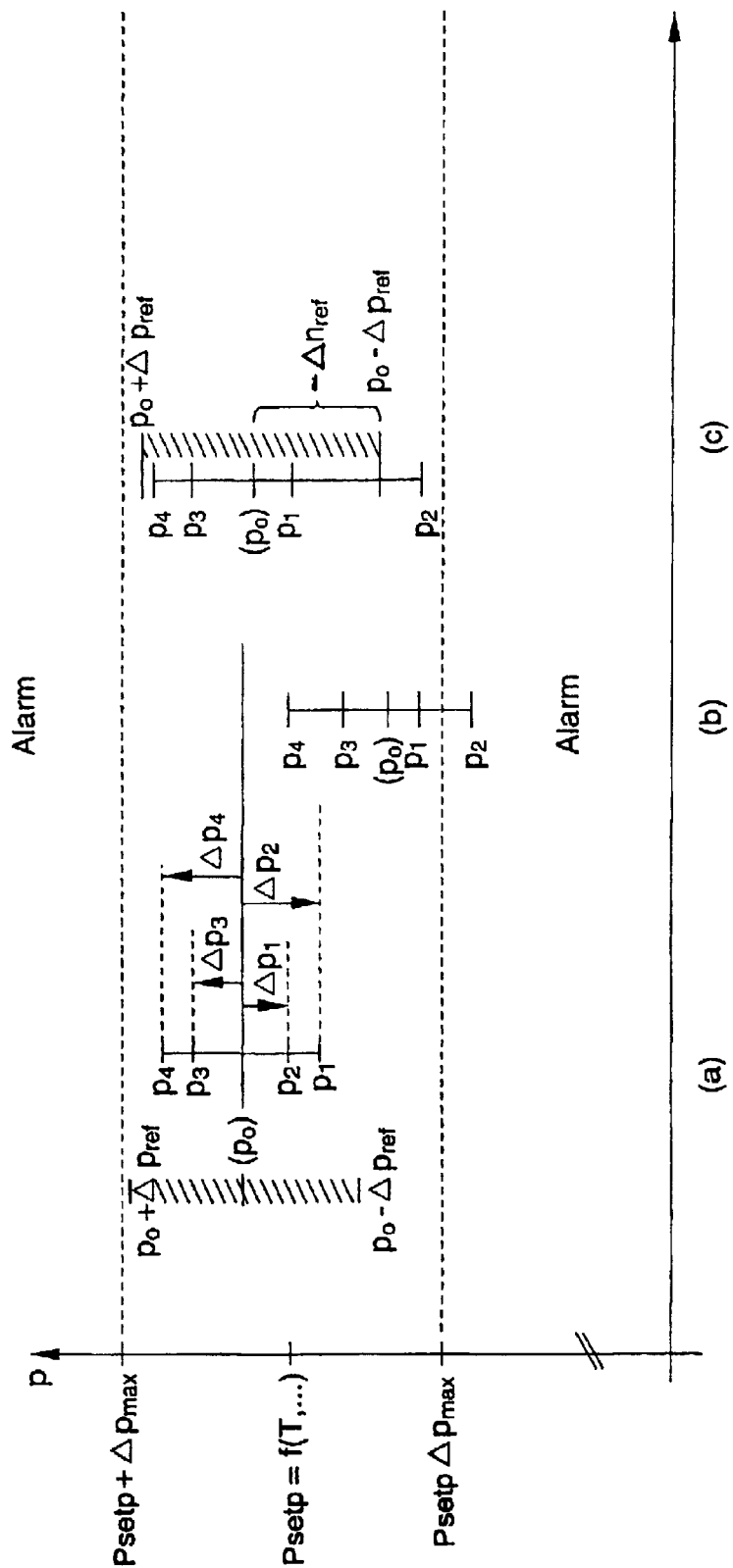
FIG. 5 is a graph explaining the method of operation of the device illustrated in FIG. 4.

The method of operation of the exemplary embodiment illustrated in FIG. 4 is illustrated in FIG. 5. Here, (a) again represents a normal state in which a correct tire pressure $p_i$ is present in all the tires, that is to say the pressures in the individual tires are in the permitted tolerance ranges. The values $\Delta p_i$ (i=1, 2, 3, 4), which are shown as pressure values, relate to deviations of the wheel speed variables $n_i$ from the reference value $n_0$. When there is a creeping pressure loss, as is illustrated by reference to state (b), this is already detected if the pressure, here the pressure $p_2$, leaves the pressure tolerance band in a single tire, although a direct measurement of pressure is not performed in this tire. The state (c) shows in turn the case in which a pressure difference which is more significant in comparison with the other tires occurs in a tire and comes about, for example, when there is tire damage or valve damage. This is already detected here during the indirect monitoring of tire pressure as an exceeding of the threshold value $\Delta n_{ref}$ and displayed to the driver.

The devices and methods which are described above allow measuring tire pressures in a motor vehicle in a particularly simple, reliable and cost-effective manner. The devices and methods according to the invention operate substantially without interventions by the driver because they are based on a tire pressure which is measured directly on only some of the tires. The devices and methods according to the invention are thus immune against operator error.

We claim:

1. A device for monitoring an air pressure in vehicle tires, comprising:
    determining units configured to determine wheel speed variables characterizing wheel speeds of a motor vehicle;
    a calculating unit operatively connected to said determining units and configured to calculate differential variables from the wheel speed variables;
    an evaluation unit configured to evaluate the differential variables with respect to a setpoint value deviation, said evaluation unit generating a warning signal if the setpoint value deviation exceeds a first threshold value;
    a measuring unit operatively connected to said evaluation unit, said measuring unit being configured to directly measure an air pressure in a tire of a wheel and configured to transmit a pressure variable characterizing the air pressure to said evaluation unit; and
    said evaluation unit further generating a warning signal if a deviation of the pressure variable from a pressure setpoint value exceeds a second threshold value, said evaluation unit using a first tolerance range for a permitted setpoint value deviation of the differential variables, the first tolerance range representing a first pressure difference range, said evaluation unit further using a second tolerance range for a permitted setpoint value deviation of the pressure variable, the second tolerance range representing a second pressure difference range, the first pressure difference range being smaller than the second pressure difference range.

2. The device according to claim 1, wherein:
    said evaluation unit determines for each respective tire a respective pressure variable from an air pressure variable measured by said measuring unit and from the differential variables, the respective pressure variable determined by said evaluation unit characterizes a respective air pressure of a respective tire; and
    said evaluation unit evaluates whether a respective setpoint value deviation of the respective pressure variable determined by said evaluation unit exceeds a corresponding threshold value.

3. The device according to claim 1, including a temperature compensation unit operatively connected to said evaluation unit, said temperature compensation unit being configured to compensate at least one quantity selected from the group consisting of a measured pressure variable and the pressure setpoint value in order to determine a deviation of the pressure variable characterizing the air pressure.

4. The device according to claim 1, wherein said evaluation unit compares the wheel speed variables with a setpoint value formed as a mean value of all wheel speed variables.

5. The device according to claim 1, wherein:
    said calculation unit determines the differential variables for respective two wheels; and
    said measuring unit for directly measuring an air pressure is assigned to one of the respective two wheels.

6. The device according to claim 1, including:
    at least a further measuring unit operatively connected to said evaluation unit for directly measuring an air pressure; and
    said measuring unit and said further measuring unit being respectively assigned to one wheel of a respective wheel axle of the motor vehicle.

7. A method for monitoring an air pressure in tires of a motor vehicle, the method which comprises:
    sensing wheel speed variables for wheels of a motor vehicle, the wheel speed variables characterizing wheel speeds;
    forming differential variables from the wheel speed variables;
    generating a warning signal if the differential variables deviate from a first setpoint value by more than a first threshold value;
    directly measuring an air pressure in a tire of one of the wheels for providing a measured air pressure value;
    generating a warning signal if the measured air pressure value deviates from a second setpoint value by more than a second threshold value; and
    setting a first tolerance range for a setpoint value deviation of the differential variables and setting a second tolerance range for a setpoint value deviation of a variable characterizing an air pressure in a tire such that the first tolerance range represents a first pressure difference range and the second tolerance range represents a second pressure difference range and such that the first pressure difference range is smaller than the second pressure difference range.

8. The method according to claim 7, which comprises:
    determining for each respective tire a respective pressure variable from a measured pressure variable and from the differential variables such that the respective pressure variable characterizes a respective air pressure of a respective tire; and
    evaluating whether a respective setpoint value deviation of the respective pressure variable exceeds a corresponding threshold value.

9. The method according to claim 7, which comprises temperature-compensating at least one quantity selected from the group consisting of a measured pressure variable and the second setpoint value.

10. The method according to claim 7, which comprises comparing the wheel speed variables with a setpoint value formed as a mean value of all wheel speed variables.

11. The method according to claim 7, which comprises:
    determining the differential variables for respective two of the wheels; and
    directly measuring an air pressure of one of the respective two of the wheels.

12. The method according to claim 7, which comprises directly measuring the air pressure of one wheel of each wheel axle of the motor vehicle.

* * * * *

UNITED STATES PATENT AND TRADEMARK OFFICE
CERTIFICATE OF CORRECTION

PATENT NO. : 6,946,954 B2  Page 1 of 1
DATED : September 20, 2005
INVENTOR(S) : Ferdinand Piech et al.

It is certified that error appears in the above-identified patent and that said Letters Patent is hereby corrected as shown below:

<u>Title page,</u>
Item [73], Assignee, should read -- Volkswagen Aktiengesellschaft, Wolfsburg (DE) --.

Signed and Sealed this

Eighth Day of November, 2005

JON W. DUDAS
*Director of the United States Patent and Trademark Office*